United States Patent
Yagyu

(10) Patent No.: US 6,648,340 B2
(45) Date of Patent: Nov. 18, 2003

(54) RING FOR FIXING OF SEALING COVER ON BALL JOINT

(75) Inventor: Walter Takeo Yagyu, Sao Bernardo Do Campo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 10/020,131

(22) Filed: Dec. 18, 2001

(65) Prior Publication Data

US 2002/0074743 A1 Jun. 20, 2002

(30) Foreign Application Priority Data

Dec. 18, 2000 (BR) .............................................. 0006515

(51) Int. Cl.[7] .............................................. F16J 15/52
(52) U.S. Cl. ........................................ 277/634; 403/134
(58) Field of Search .................. 277/634, 635, 277/641; 403/134

(56) References Cited

U.S. PATENT DOCUMENTS

| | | | | |
|---|---|---|---|---|
| 2,197,037 A | * | 4/1940 | Gardner ...................... | 403/134 |
| 3,028,203 A | * | 3/1962 | Lund et al. .................. | 384/485 |
| 3,208,290 A | * | 9/1965 | Mathues et al. .............. | 403/38 |
| 3,357,728 A | * | 12/1967 | Melton et al. ............... | 403/134 |
| 3,403,932 A | * | 10/1968 | Kutcher ....................... | 403/51 |
| 4,921,368 A | * | 5/1990 | Busse et al. ................. | 403/134 |
| 5,312,200 A | * | 5/1994 | Buhl et al. ................... | 403/134 |

* cited by examiner

*Primary Examiner*—William Miller
(74) *Attorney, Agent, or Firm*—Liniak, Berenato & White

(57) ABSTRACT

A ball joint comprises an elastomeric sealing cover and a metal straining ring for fixing the sealing cover in the ball joint. First end of the sealing cover is coupled to an external face of a ball joint box, thus defining a sealing ring, and second end of the sealing cover is coupled to a body of a pin of the ball joint. The sealing cover includes a sealing lip formed at the first end thereof. The straining ring has an internal flap mounted by interference fitting on the external face of the ball joint box, and an external flap. During the assembly of the ball joint, the external flap of the straining ring is bend over the sealing lip of the sealing cover for engaging the sealing lip and providing sealing to the ball joint and fastening the sealing cover to the ball joint box.

5 Claims, 1 Drawing Sheet

FIG. 1
FIG. 2
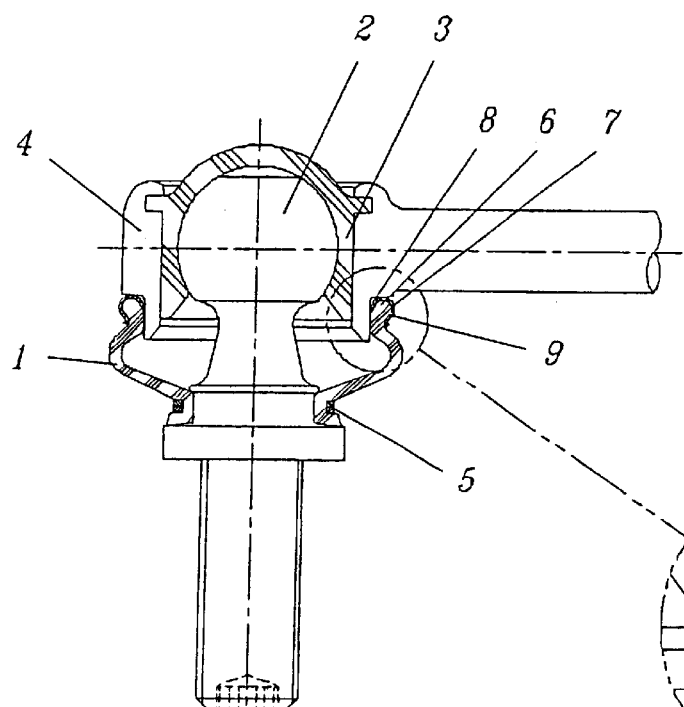
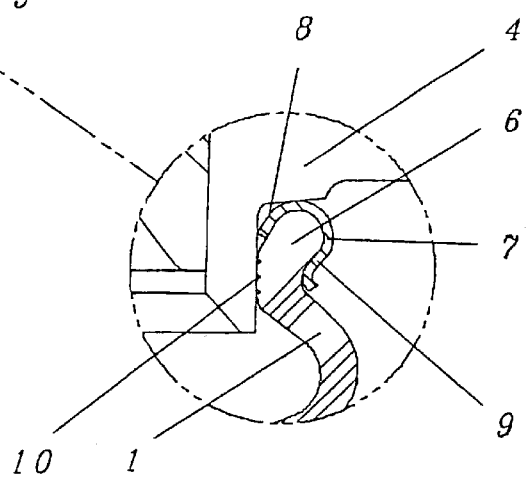

RING FOR FIXING OF SEALING COVER ON BALL JOINT

BACKGROUND OF THE INVENTION

1. Field of the Invention

This invention refers to a ring for fixing of a sealing cover on ball joints that are applied in connections that require angular and rotational movement of two pieces, more specifically, for application in automotive vehicles.

2. Description of Related Art

The ball joints intended for this purpose need a sealing system to prevent impurities such as dust, sand and water from penetrating its interior and affecting the operation by the premature wearing out of their components, since these pieces operate by the coupling of their components. The components must possess between themselves the best possible conformation, since, after the mounting of the coupled assembly it is applied a certain load of displacement to the movable pieces, which load is produced by the friction of these movable pieces between themselves. As a consequence, the presence of impurities between the pieces operating under friction action tends to cause a premature wearing out of the components and the wear of the ball joint. The ball joints of the prior art are normally composed of a pin having the ball-type end coupled to a bearing, of single or split type. The ball joint assembly is mounted in the interior of a box, having a hole, through which has been mounted the ball pin and the bearing. The hole is subsequently sealed by a boot or sealing cover attached to the box, so as to prevent the entry of any impurity. At the end of the box, opposite to a closing cover, there is projected through the hole the non-spherical part of the pin, called a body of the ball pin, to which must be fixed one of the pieces that requires angular and rotational movement, while the other piece is fixed to the box of the ball joint. In this way, the angular and rotational movement provided between the ball pin and the box of the ball joint must attend the needs of the pieces that are there connected. However, there is a need in the sealing of the box through the boot or cover placed therein, to prevent the entry of impurities in the interior of the ball joint, in the opposite end, through where is projected the body of the ball pins. The sealing system must be perfect and efficient, mainly due the fact that it is in this place that the ball pin is moved angular and rotationally relative to the box. The prior art protects the interior of the ball joint with a sealing cover that is constituted by a boot or cover made of elastomer, with two ends open, one of bigger diameter, to be coupled to the external part of the box and the other of smaller diameter to be coupled to the body of the ball pin. When performing the coupling of the external part of the box, the fixing of the sealing cover normally is carried out in a channel provided therein, where is placed the end of bigger diameter of the sealing covers. The end of bigger diameter of the sealing ring is overlapped with an elastic ring, whose function is to fix the sealing cover on the box and prevent the entry of any impurity. The end of smaller diameter of the sealing ring is provided for the coupling of the body of the ball pin with a ring, commonly called sealing ring, whose function is to firmly fix the sealing cover on the body of the ball pin, preventing the entry of impurities, but not without allowing its rotational movement.

The existing sealing system of the sealing cover to the ball joint box, however, has shown some undesirable effects, related to the efficiency of the sealing and to the high cost arising from the machining of the channel in the box, to fasten the sealing cover, to the wasting of material resulting of the machining residues, and even to the manufacturing difficulties of the system related to the assembling of the elastic rings on the ball joints, where may occur damages to the sealing cover.

SUMMARY OF THE INVENTION

The present invention overcomes these undesirable effects, providing a sealing system of a ball joint with a novel construction of a straining ring and with the shaping of an end of bigger diameter of a sealing cover. The new construction of the straining ring provides a perfect connection with a ball joint box. The sealing system of this invention eliminates the machining of the box for the making of the channel, as it is required in the prior art, and may be utilized directly in the forged or stamped box, without any machining whatsoever, never getting loose from the assembling place and, with the close cooperation of the material of the sealing cover. The invention provides a perfect sealing of the ball joint preventing the entry of any impurity in the interior of the ball joint.

BRIEF DESCRIPTION OF THE DRAWINGS

Next, this invention is detailed, being shown the description of one preferred embodiment, as illustrated in the attached drawings, in which:

FIG. 1 shows the sealing cover coupled to the ball joint represented in longitudinal section; and FIG. 2 shows the longitudinal cross-section, in enlarged detail, of the straining ring and sealing cover coupled to the ball joint.

DETAILED DESCRIPTION OF THE PREFERRED EMBODIMENT

The FIGS. 1 and 2 of the accompanying drawings show the preferred embodiment of a ball joint of the invention, comprising a pin with one of it ends, having a spherical-shaped ball end 2, that is coupled to a bearing 3. The assembled pin with the ball end 2 and the bearing 3 are mounted in an interior of a ball joint box 4. A sealing system for the ball joint of the present invention includes an elastomeric sealing cover 1 mounted on the ball joint and provided with an opening of smaller diameter with a sealing ring 5 that fixes it to a body of the pin of the ball end 2 providing the sealing of the ball joint. The sealing cover 1 prevents entry of any impurity in the interior of the ball joint, and also guarantees the desired rotational movement for the ball end 2. The sealing cover 1, at the end of bigger diameter, has a sealing lip 6. The sealing system of the ball joint further includes a straining ring 7 made of steel, that is inserted with interference in the box 4. The straining ring 7 includes an internal flap 8 engaging the ball joint box 4, and an external flap 9 bend over the sealing lip 6 of the sealing cover 1. In the mounting process, the internal flap 8 of the straining ring 7 is mounted with interference to an external face of the box 4 of the ball joint, and engages the sealing lip 6 of the sealing cover 1. As illustrated in FIG. 2, the internal flap 8, being driven in the box 4 of the ball joint at a specific angle, tends to be forced in direction to the opposite side, being driven inside even further. During the mounting process, a mounting tool utilized for such operation, when pressing an internal face of the straining ring 7 against the external face of the box 4 to overcome the interference of the internal flap 8 of the straining ring 7, presses its external flap 9, over the sealing lip 6, in such a way that the sealing lip 6 is pressed against the external face of the box 4, thus firmly adhering to it. Preferably, the sealing lip 6 of the sealing cover 1 is provided with an internal knurled face 10, providing the required sealing. At the same time this external flap 9 of the straining ring 7 closes itself against the sealing lip 6 fastening the sealing cover 1 to the ball joint box 4.

From the foregoing description, it is clear that the present invention overcomes the undesirable effects of the prior art by providing the sealing system in the ball joint with the straining ring for engaging the end of bigger diameter of the sealing cover. The new construction of the sealing system for the ball joint including the straining ring provides an improved connection with the ball joint box. The structure of this invention eliminates the operation of machining of the box for the making of the channel, as it is required in the prior art, and may be utilized directly in the forged or stamped box, without any machining whatsoever, never getting loose from the assembling place in function of its form of construction and, with the close cooperation of the very material of the sealing cover. The invention provides a perfect sealing of the ball joint preventing the entry of any impurity in the interior of the ball joint.

While the foregoing invention has been shown and described with reference to a preferred embodiment, it will be understood by those of skill in the art that various changes in form and detail may be made therein without departing from the spirit and scope of the present invention.

What is claimed is:

1. A sealing system in a ball joint comprising:

a sealing cover made of elastomer and having two open ends, one end of bigger diameter to be coupled to an external face of a ball joint box and another end of smaller diameter to be coupled to a body of a ball end pin, the sealing cover having a sealing lip formed directly in the open end of bigger diameter of the sealing cove the external face of the ball joint box being substantially parallel to a longitudinal axis of the ball end pin; and a straining ring, coupled to the sealing lip and, mounted to the external ace of the ball joint box through interference of an internal face of an internal flap of the straining ring with the external face of the ball joint box.

2. The sealing system in the ball joint, according to claim 1, wherein the straining ring is non-removably mounted to the external face of the ball joint box.

3. The sealing system in the ball joint, according to claim 1, wherein the straining ring further comprising an external flap that is bent over the sealing lip of the sealing cover in such a way that during the assembly of the ball joint, the external flap of the straining ring is pressed against the sealing lip of the sealing cover and this against the external face of the ball joint box, providing a sealing of the ball joint and fastening the sealing cover in the interior of the straining ring.

4. The sealing system in the ball joint, according to claim 1, wherein the sealing lip is provided with a knurling in an internal face thereof.

5. The sealing system in the ball joint, according to claim 1, wherein the straining ring is made of metal.

* * * * *